(12) United States Patent
Son et al.

(10) Patent No.: US 9,601,822 B2
(45) Date of Patent: Mar. 21, 2017

(54) ANTENNA FOR SATELLITE COMMUNICATION

(71) Applicant: Intellian Technologies INC., Pyeongtaek-si (KR)

(72) Inventors: Min Son Son, Hwaseong-si (KR); Geun Ho Choi, Osan-si (KR); A Ruem Han, Bucheon-si (KR)

(73) Assignee: INTELLIAN TECHNOLOGIES INC., Pyeongtaek-si (KR)

( * ) Notice: Subject to any disclaimer, the term of this patent is extended or adjusted under 35 U.S.C. 154(b) by 50 days.

(21) Appl. No.: 14/428,108

(22) PCT Filed: Jul. 31, 2013

(86) PCT No.: PCT/KR2013/006859
§ 371 (c)(1),
(2) Date: Mar. 13, 2015

(87) PCT Pub. No.: WO2014/042358
PCT Pub. Date: Mar. 20, 2014

(65) Prior Publication Data
US 2015/0236397 A1    Aug. 20, 2015

(30) Foreign Application Priority Data
Sep. 17, 2012    (KR) ......................... 10-2012-0102596

(51) Int. Cl.
*H01Q 3/08*    (2006.01)
*H01Q 1/00*    (2006.01)
*H01Q 1/12*    (2006.01)

(52) U.S. Cl.
CPC ............. *H01Q 1/005* (2013.01); *H01Q 1/125* (2013.01); *H01Q 3/08* (2013.01)

(58) Field of Classification Search
CPC ........... H01Q 1/005; H01Q 3/08; H01Q 1/125
(Continued)

(56) References Cited

U.S. PATENT DOCUMENTS 5,485,169 A    1/1996 Kitabatake et al.
7,663,565 B2    2/2010 Son et al.
(Continued)

FOREIGN PATENT DOCUMENTS

EP    2445052    4/2012
KR    1998052693    10/1998
(Continued)

OTHER PUBLICATIONS

European Search Report—European Application No. 13836271.0, issued on Mar. 23, 2016, citing U.S. Pat. No. 5,485,169, US 2010/149059, US 2012/001816, KR 1998 0052693 and EP 2 445 052.
(Continued)

*Primary Examiner* — Dameon E Levi
*Assistant Examiner* — Hasan Islam
(74) *Attorney, Agent, or Firm* — Cantor Colburn LLP (57) ABSTRACT

An antenna for satellite communication includes; a signal transmitting and receiving unit for receiving or transmitting a signal from/to the satellite; a driving unit for rotating the signal transmitting and receiving unit so as to enable the signal transmitting and receiving unit to track the satellite; an anti-vibration unit provided inside the posts for elastically supporting the signal transmitting and receiving unit or the driving unit. Therefore, by providing the anti-vibration unit inside the posts, it is possible to increase availability for a circumferential space of the posts and to simplify the structure of the anti-vibration unit.

11 Claims, 7 Drawing Sheets

(58) Field of Classification Search
USPC .......................... 343/763, 766, 882, 781 CA
See application file for complete search history.

(56) References Cited

U.S. PATENT DOCUMENTS

| | | | |
|---|---|---|---|
| 9,300,039 B2 | 3/2016 | Conti et al. | |
| 2010/0149059 A1* | 6/2010 | Patel .................... | H01Q 1/005 |
| | | | 343/765 |
| 2012/0001816 A1* | 1/2012 | Blaney ................. | H01Q 25/00 |
| | | | 343/765 |

FOREIGN PATENT DOCUMENTS

| | | |
|---|---|---|
| KR | 2019980052693 | 10/1998 |
| KR | 1020050037011 | 4/2005 |
| KR | 1020070043165 | 4/2007 |
| KR | 1020100072893 | 7/2010 |

OTHER PUBLICATIONS

International Search Report—PCT/KR2013/006859 dated Nov. 27, 2013.

* cited by examiner

ANTENNA FOR SATELLITE COMMUNICATION

TECHNICAL FIELD

The present invention relates to an antenna for satellite communication, and more particular to an antenna for satellite communication in which an anti-vibration unit is formed inside posts that support a signal transmitting and receiving unit, wherein the anti-vibration unit prevents vibrations caused by movement of an antenna for satellite communication-mounted object from being applied to the signal transmitting and receiving unit.

BACKGROUND ART

A satellite antenna is commonly used for satellite communication, high-capacity wireless communication, etc. The satellite antenna concentrates signals received using the principle of a reflecting telescope on at least one focus. In general, on the focal position of the satellite antenna, a horn antenna or a feed horn may be installed Here, the representative satellite antenna may be a parabolic antenna.

The satellite antenna generally has a pedestal structure capable of performing rotation movement based on 3 axes because the horn antenna or the feed horn should always be positioned toward the satellite located at constant position. A power transmission unit using a plurality of belts and pulleys is used for the satellite antenna so as to enable the 3 axes-based rotation movements.

The satellite antenna is used with a damper having a parabolic shape to support the weight of a main reflecting plate, including the power transmission unit of the satellite antenna, or to prevent vibrations or shocks caused due to the surrounding environment.

In the conventional satellite antenna, a single spring disposed inside a pillar member is used to attenuate the vibrations or shocks on the antenna, but vibration or shock absorbing capacity is not large because a single spring is used, thereby causing a problem that sufficient attenuation is not performed.

Further, when the spring is compressed to the maximum and the windings of the spring are directly in contact with each other, the shocks and vibrations will not be absorbed at all, and the non-absorbed shocks and vibrations are transmitted to the electronic components of the satellite antenna or the like, hereby causing a problem that the antenna is malfunctioning.

DISCLOSURE

Technical Problem

An embodiment of the present invention provides an antenna for satellite communication having an anti-vibration unit spatially formed in one body with posts for supporting a signal transmitting and receiving unit including a main reflecting plate.

Another embodiment of the present invention provides an antenna for satellite communication that is capable of extending the range of the shock absorption by using a plurality of damper springs.

Further another embodiment of the present invention provides an antenna for satellite communication that is capable of preventing a direct contact between the windings of the damper spring.

Further another embodiment of the present invention provides an antenna for satellite communication that is capable of attenuating a vibration or shock applied in up-down direction as well as other direction.

Technical Solution

In order to accomplish the objects as described above, the antenna for satellite communication according to an embodiment of the present invention may comprise a signal transmitting and receiving unit for receiving or transmitting a signal from/to the satellite; a driving unit for rotating the signal transmitting and receiving unit so as to enable the signal transmitting and receiving unit to track the satellite; an anti-vibration unit provided inside the posts for elastically supporting the signal transmitting and receiving unit or the driving unit.

By providing the anti-vibration unit inside the posts as described above, it is possible to increase availability for a circumferential space of the posts and to simplify the structure of the anti-vibration unit.

The posts include a first post on which the signal transmitting and receiving unit or the driving unit is mounted and a second post provided at a lower portion of the first post in such a manner as to be spaced apart from each other. The anti-vibration unit may be accommodated inside the second post and the first post may be connected to the top the anti-vibration unit.

The anti-vibration unit may include a damper shaft provided inside the second post along the longitudinal direction of the second post and a plurality of damper springs provided on the outer surface of the damper shaft along the longitudinal direction of the damper shaft.

The anti-vibration unit includes an upper holder neck for supporting the upper portion of the damper shaft and a lower holder neck for supporting the lower portion of the damper, and the top and lower of the damper shaft may be formed to upwardly and downwardly move through the upper holder neck and the lower holder neck, respectively.

The plurality of damper springs is vertically arranged along the longitudinal direction of the damper shaft, and the damper shaft may be formed with a compartment for separating the damper spring.

The plurality of damper springs may have at least different one of winding length, cross-sectional shape, diameter and elastic modulus from each other.

The damper may further include an elastic member provided between the windings of the damper spring.

The elastic member has the same winding form as the damper spring and may prevent the windings of the damper spring from being in contact with each other.

The elastic member may be formed using at least one of rubber, silicone and urethane.

A lifting guide for vertical movement of the first post with respect to the second post may be formed on the same side of the first post and the second post.

The lifting guide may include a pair of guide bearings mounted at any one side of the first post and the second post; and lifting members mount at the side of the other post, located between the pair of guide bearings, and being in contact at least one of the guide bearings.

The lifting members may include a first stopper mounted at one side of either the first post or the second post; a guide formed integrally with the first stopper in such a manner as to have a smaller width than the first stopper and located between the pair of guide bearings; and a second stopper formed integrally with the guide in such a manner as to have a greater width than the first stopper and opposite to the first stopper with respect to the guide.

Any one of the first stopper and the second stopper may be located at one same side of the posts as the pair of guide bearings.

A length of the guide is formed to be smaller than the maximum relative movement distance of the first post with respect to the second post. A curved surface may be formed on a side surface at an area where the first stopper and the second stopper are connected with the guide.

The lower end of the second post is supported by a plurality of mounts disposed radically with respect to the center of the second post, and the anti-vibration unit and the mount are capable of attenuating vibrations or external forces with vibration frequencies of the different bands.

Advantageous Effects

As described above, the antenna for satellite communication according to an embodiment of the present invention is capable of improving availability for circumferential space of the post s by forming an anti-vibration unit within the posts.

The antenna for satellite communication according to another embodiment of the present invention is capable of preventing a direct contact between the windings of the damper spring by inserting the elastic member between the damper springs.

The antenna for satellite communication according to another embodiment of the present invention is capable of attenuating the vibrations or shocks applied to the signal transmitting and receiving unit in different directions as well as in a longitudinal direction.

The antenna for satellite communication according to another embodiment of the present invention is capable of preventing the posts, which perform an uplift or vertical movement due to an elastic force of the anti-vibration unit from being separated from each other, or rotating by including a lift guide.

The antenna for satellite communication according to another embodiment of the present invention is capable of increasing the vibration or shock absorbing capacity with respect to the vertical direction by including a plurality of damper springs which form an anti-vibration unit and setting the springs differently in physical constant.

BEST MODE

Hereinafter, embodiments of the present invention will be described in detail with reference to the accompanying drawings. However, the present invention is not limited to or restricted by the embodiments. Like reference numerals in the drawings denote like elements.

Figure 1:
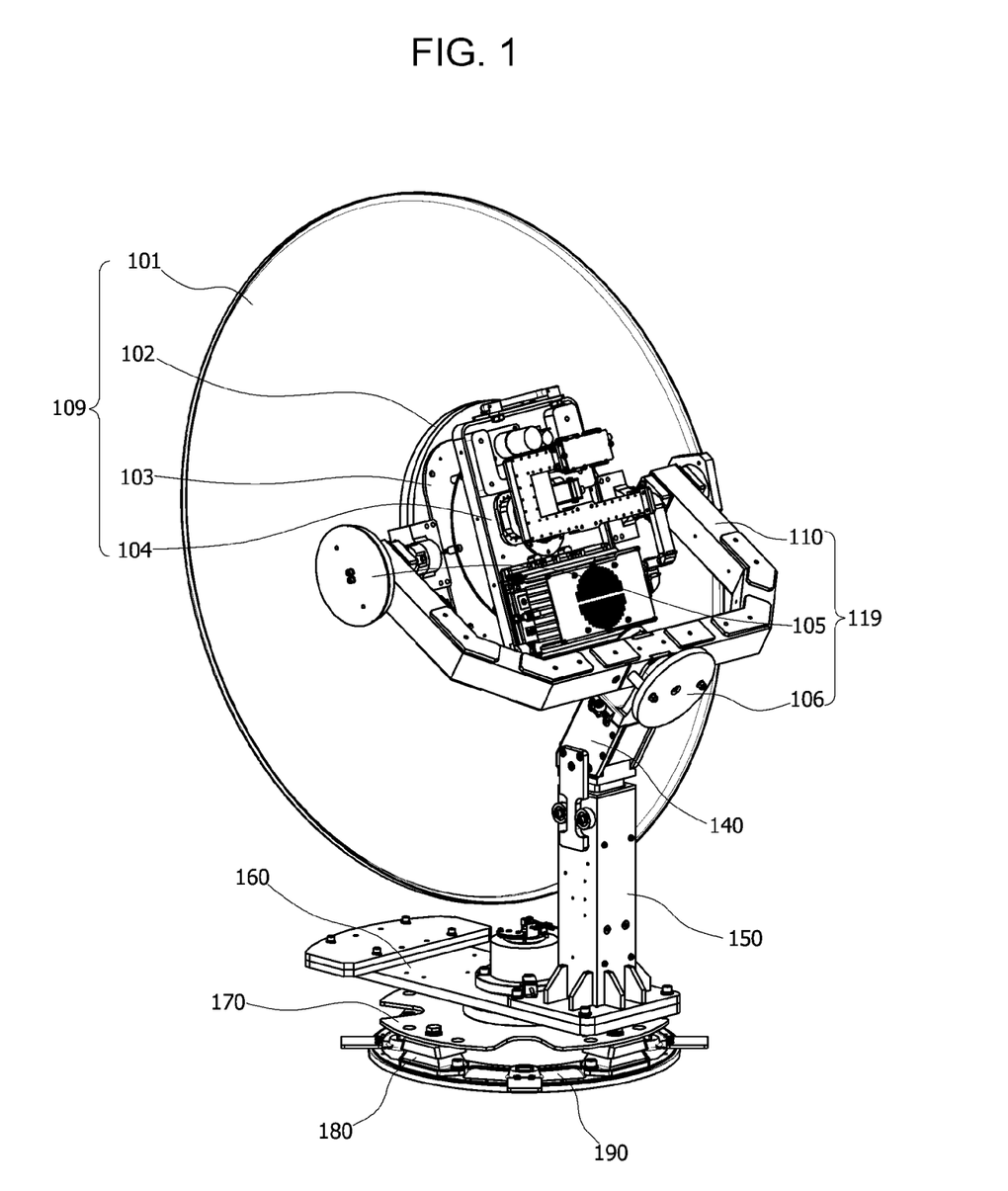
FIG. 1 is a perspective view showing an antenna for satellite communication according to an embodiment of the present invention.
Figure 2:
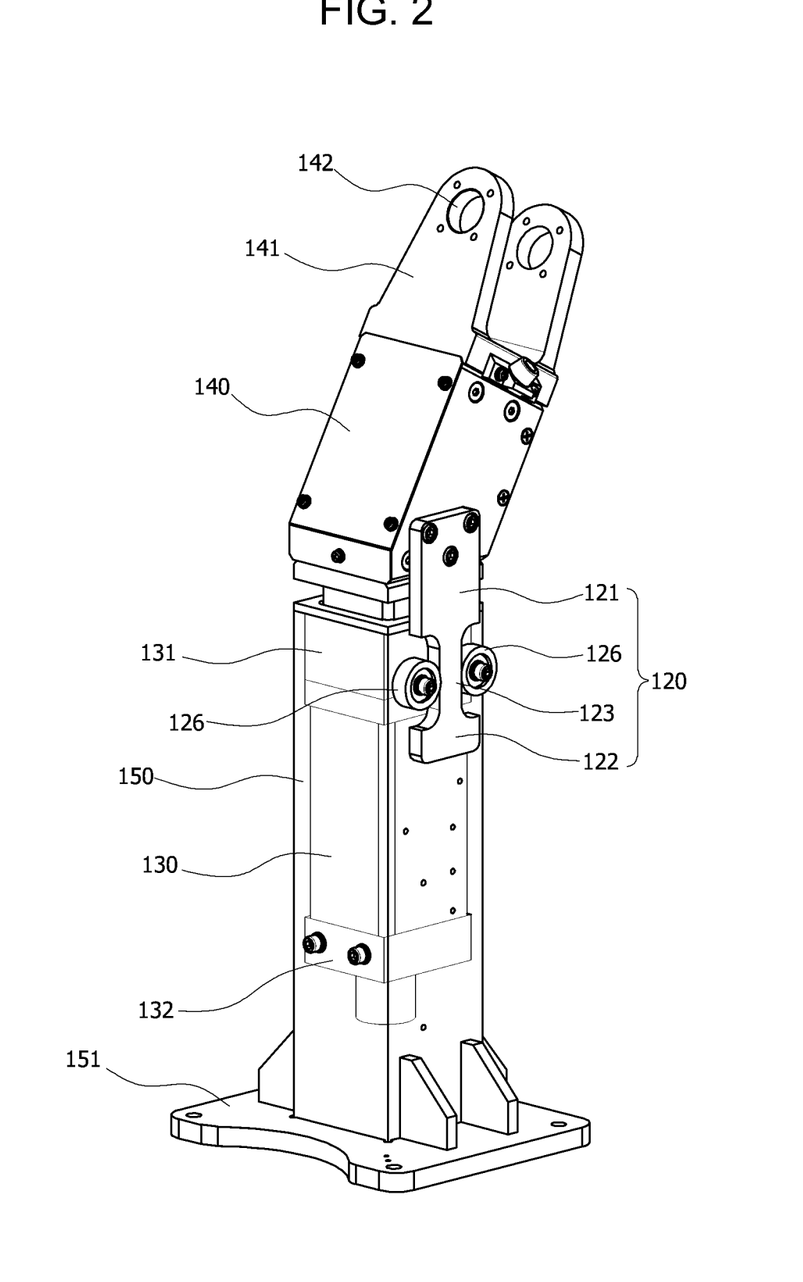
FIG. 2 is a perspective view showing an anti-vibration unit according to FIG. 1.
Figure 3:
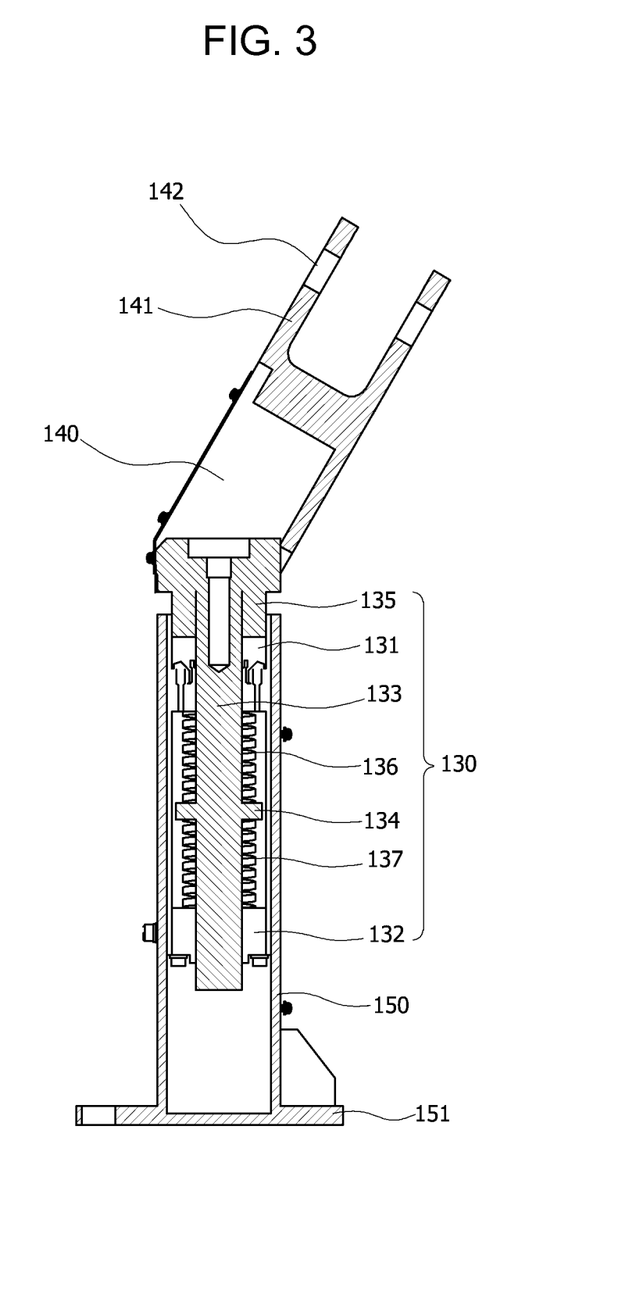
FIG. 3 is a longitudinal cross-sectional view showing the anti-vibration unit according to FIG. 2.
Figure 4:
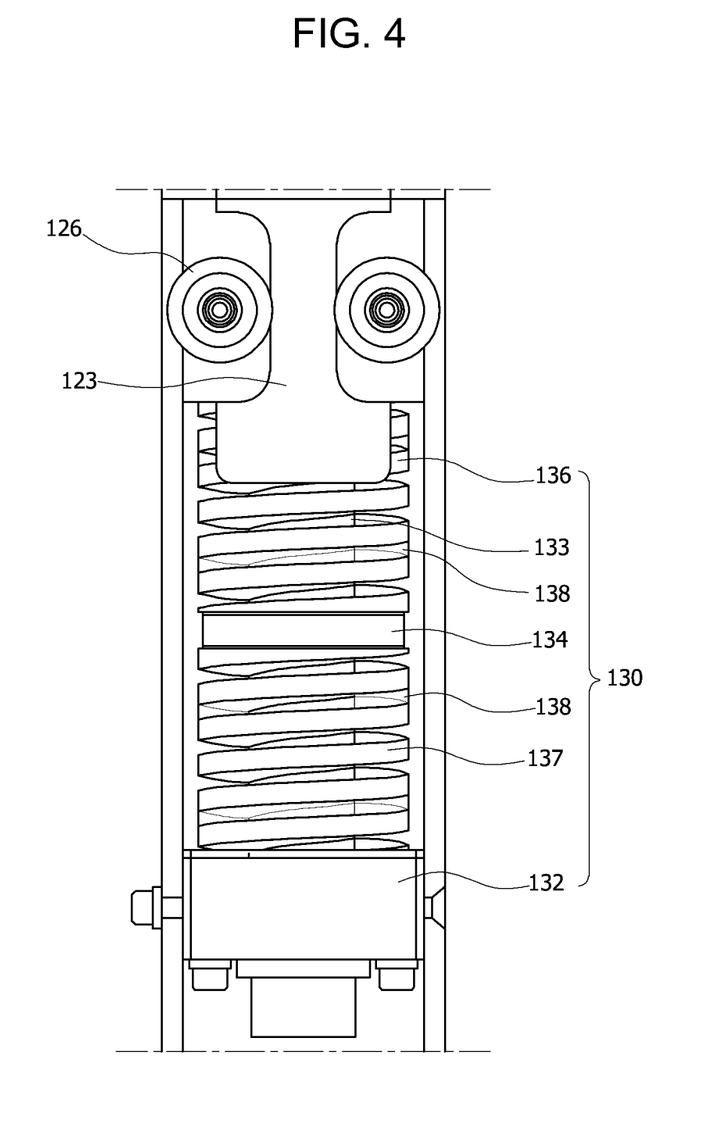
FIG. 4 is a front view showing the center of the anti-vibration unit according to FIG. 3.
Figure 5:
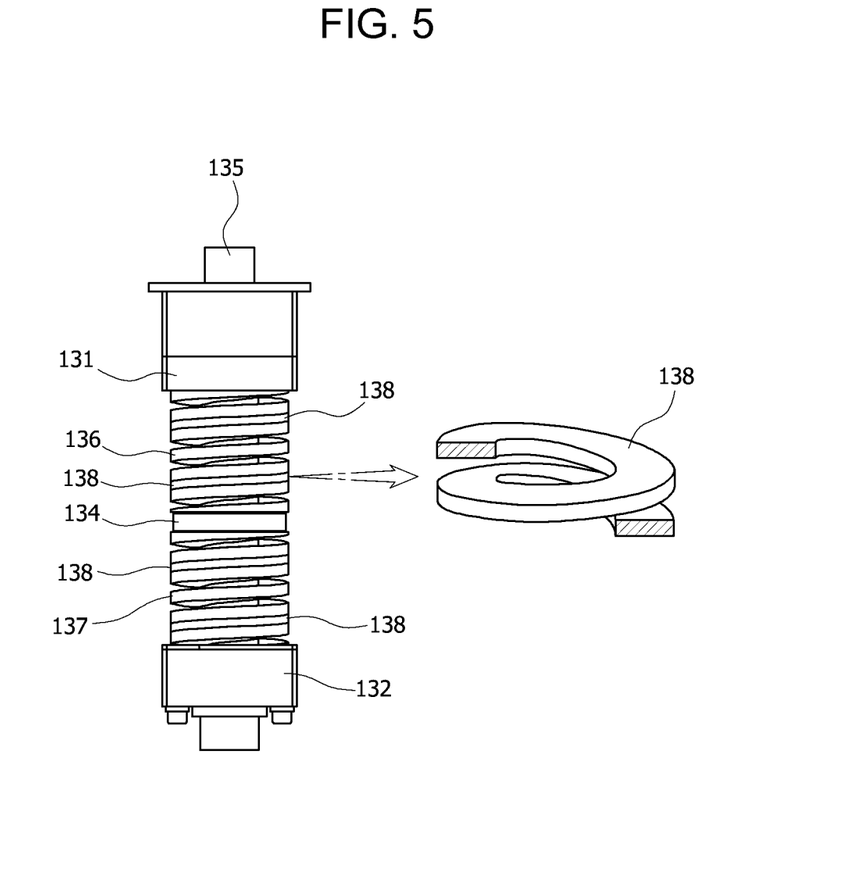
FIG. 5 is a perspective view showing the center of the anti-vibration unit according to FIG. 4.
Figure 6:
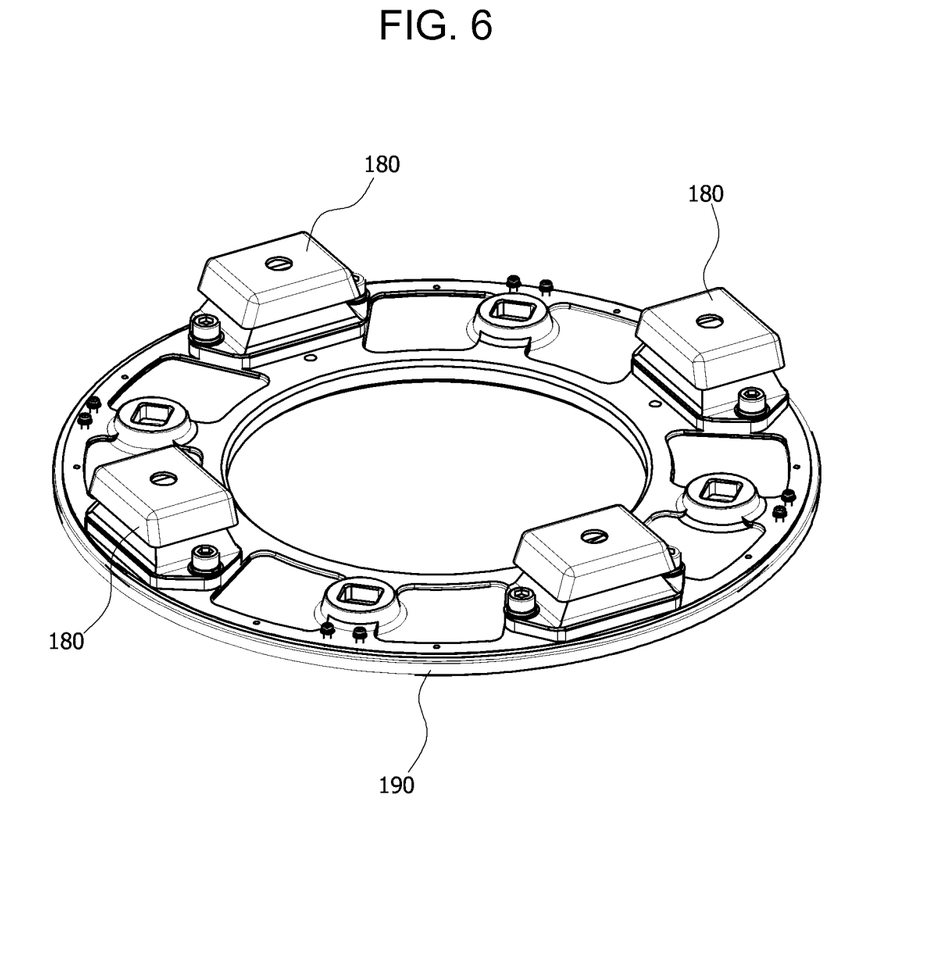
FIG. 6 is a perspective view showing a mount and a mount plate for supporting the lower portion of the antenna for satellite communication according to FIG. 1.
Figure 7A:
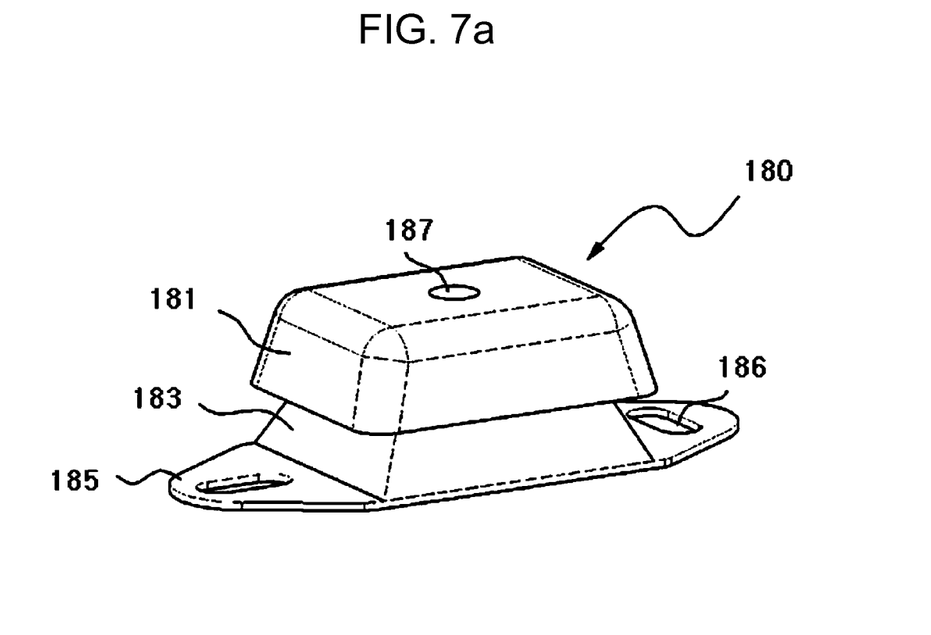
FIG. 7a and FIG. 7b are cross-sectional views showing the mount according to FIG. 6.
Figure 7B:
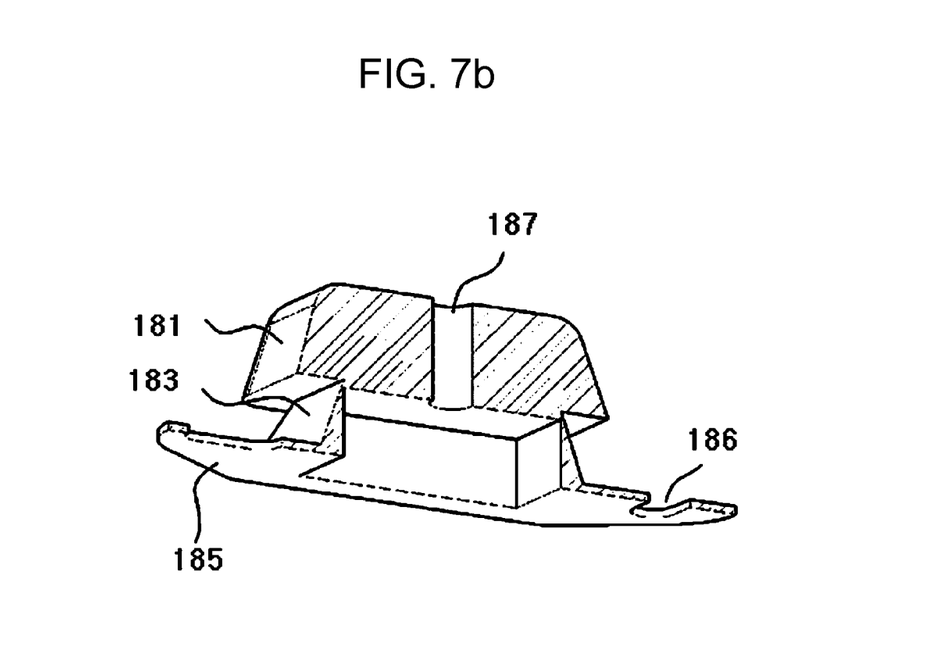

FIG. 1 is a perspective view showing an antenna for satellite communication according to an embodiment of the present invention, FIG. 2 is a perspective view showing an anti-vibration unit according to FIG. 1, FIG. 3 is a longitudinal cross-sectional view showing the anti-vibration unit according to FIG. 2, FIG. 4 is a front view showing the center of the anti-vibration unit according to FIG. 3, FIG. 5 is a perspective view showing the center of the anti-vibration unit according to FIG. 4, FIG. 6 is a perspective view showing a mount and a mount plate for supporting the lower portion of the antenna for satellite communication according to FIG. 1, and FIGS. 7a and 7b are cross-sectional views showing the mount according to FIG. 6.

Referring to FIG. 1, an antenna for satellite communication 100 according to an embodiment of the present invention may include a signal transmitting and receiving unit 109 for transmitting and receiving a signal to/from the satellite; a driving unit 119 for rotating the signal transmitting and receiving unit 109 so as to enable the signal transmitting and receiving unit 109 to track the satellite; posts 140, 150 provided in a longitudinal direction for supporting the driving unit 119; and an anti-vibration unit 130 provided inside the posts 140, 150 for elastically supporting the signal transmitting and receiving unit 109. By providing the anti-vibration unit 130 inside the posts 140, 150 as described above, it is possible to increase availability for a circumferential space of the posts and to simplify the structure of the anti-vibration unit.

Here, the anti-vibration unit 130 may be a kind of vibration absorbing unit that prevents vibrations or shocks caused due to motion or movement of a moving object, such as a ship in which the antenna for satellite communication 100 is mounted, from being delivered to the signal transmitting and receiving unit 109, etc.

The antenna for satellite communication 100 according to an embodiment of the present invention, which is particularly an antenna for satellite communication s which is capable of transmitting and receiving multi polarization, is capable of two-ways communication including the Internet communication, thereby receiving signals from the satellite as well as transmitting signals toward the satellite, and is called a VSAT (Very Small Aperture Terminal) antenna.

Here, the signal transmitting and receiving unit 109 may include a reflecting plate 101 for collecting the signals to receive the signals from the satellite; a feed horn (not shown) for receiving the signals reflected from the reflecting plate 101, and a signal-processing unit 104 for processing the signals passing through the feed horn. The reflecting plate 101 and the signal processing unit 104 can be connected to each other through a reflecting plate flange 102 and a bearing guide 103. Thus, the signal transmitting and receiving unit 109 may include a reflecting plate 101, a reflecting plate flange 102, a bearing guide 103 and a signal-processing unit 104.

However, the VSAT antenna is only an example for the antenna for satellite communication according to an embodiment of the present invention and the antenna described in the present invention is not limited to it having such a type or size.

On the other hand, the antenna for satellite communication 100 according to an embodiment of the present invention, which is mounted in a ship, etc, always tracks the satellite even in the moving ship or at turbulent waves and therefore has to be directed to the satellite. Therefore, the reflecting plate 101 should include a driving unit 119 which may rotate about the three axes, X Y, Z axes so that the reflecting plate 101 can always be directed to the desired satellite from which the signals are received.

As shown in FIG. 1, the driving unit 119 should be able to enable the signal transmitting and receiving unit 109 to rotate about a Z-axis direction disposed with the horn antenna, X-axis direction disposed with a horizontal post 110 or a Y axis direction disposed with a main post Since the driving unit 119 may include various kinds of motors, support frames, pulleys 105,106 and belts, etc., it is considered that the weights of the signal transmitting and receiving unit 109 and the driving unit 119 occupy most of weight of the antenna for satellite communication Thus, vibrations or shocks are always be delivered to the signal transmitting and receiving unit 109 by a moving ship or waves wherein, if such vibrations or shocks are not attenuated, the driving unit 119 or the signal transmitting and receiving unit 109 can be damaged or the signal transmission and reception sensitivity can be lowered due to increased fatigue load, etc.

Likewise, an anti-vibration unit 130 is arranged inside the posts 140 150 in orders to attenuate the vibrations or shocks on the signal transmitting and receiving unit 109 or the driving unit 119.

The posts 140 150 are a pillar for supporting most of the weight of the antenna for satellite communication 100 including the signal transmitting and receiving unit 109 and the driving unit 119 and for securing the antenna for satellite communication 100 to a ship or the like, and it is necessary that the inside of the posts should be in a form of hollow to secure a sufficient space therein. Various kinds of cables, which supply power or transmit the signals to various kinds electric/electronic components composing the signal transmitting and receiving unit 109 and the driving unit 119, may pass through the inside of the posts 140, 150 or the anti-vibration unit 130 can be arranged inside the posts 140, 150.

The posts 140, 150 may be separately formed by the first post 140 and the second post 150. That is, it is possible to separately form the first post 140 on which the signal transmitting and receiving unit 109 or the driving unit 119 is mounted and the second post 150 provided at the lower portion of the first post 140 to be spaced apart from the first post 140.

A horizontal post 110 of the driving unit 119 is rotatably mounted on the first post 140 at the upper portion, and a pedestal 160 is fixed to the lower end of the second post 150. The pedestal 160 may be rotated on a damping base 170.

The bottom of the damping base 170 is elastically supported by a plurality of mounts 180, and the mount 180 may be fixed on the mount plate 190. Thus, the lower end of the second post 150 may be supported by the plurality of mounts 180 disposed radically with respect to the center of the second post 150. The mount 180 is capable of attenuating twists as well as vertical or horizontal directional vibrations applied to the components disposed above the top of the damping base 170.

Referring to FIG. 2, the anti-vibration unit 130 is accommodated inside the second post 150, and the top of the anti-vibration unit 130 can be connected with the first post 140. That is, the anti-vibration unit 130 is arranged inside the second post 150 so as to prevent vibrations or shocks, which are caused due to the motion or movement of a moving object on which the antenna 100 is mounted, from being applied to the signal transmitting and receiving unit 109 or the driving unit 119, etc. when the first post 140 performs a vertical motion or lifts up with respect to the second post 150.

The first post 140 may have a sloped shape with respect to the second post 150, to easily adjust an elevation angle of the reflecting plate 101. However, the form, position, connection angle and the like of the first post 140 and the second post 150 may be properly adjusted depending on the performance, the size and the like of the antenna.

The first post 140 is formed with a connecting hole 142 at the top for rotatably connecting the horizontal post 110, and an end portion 141 in which the connecting hole 142 is provided can be formed in such a shape that the width is gradually narrower toward the top. A lower pillar (not shown) of the first post 140, which is connected to a lower portion of the end portion 141, has a trapezoidal shape when viewed from the side.

The second post 150 is a hollow tube in a vertically upstanding form. At this time, it is desirable that the cross surface of the second post 150 has a non-circular shape for preventing rotation at a state in which the first post 140 is connected to the second post 150. A flange 151 formed at the bottom of the second post 150 is fixed to the pedestal 160.

As shown in FIGS. 2 and 3, the anti-vibration unit 130 may be inserted into second post 150. The top and bottom of the anti-vibration unit 130 can be fixed and supported by an upper holder neck 131 and a lower holder neck 132, respectively. The upper holder neck 131 and lower holder neck 132 are inserted into the second post 150, and thereby the anti-vibration unit 130 may be provided inside the second post 150. The upper holder neck 131 and lower holder neck 132 may individually be fixed to the second post 150 by a fastening member (not shown) such as a bolt.

Meanwhile, the anti-vibration unit 130 may include a damper shaft 133, which is provided inside the second post 150 along the longitudinal direction of the second post 150, and a plurality of damper springs 136,137 provided on the outer surface of the damper shaft 133 along the longitudinal direction thereof. The damper shaft 133 may be formed with a compartment 134 for separating namely, spatially separating the damper springs 136 137. The compartment 134 protrudes beyond the outer circumferential surface of the damper shaft 133 and is capable of supporting the damper springs 136,137 arranged at the upper and lower portions of the compartment 134, respectively.

Referring to FIG. 3, the anti-vibration unit 130 may include an upper holder neck 131 for supporting the upper portion of the damper shaft 133 and a lower holder neck 132 for supporting the lower portion of the damper shaft 133. The top and lower of the damper shaft 133 may be formed to upwardly and downwardly move through the upper holder neck 131 and the lower holder neck 132, respectively. The top and lower of the damper shaft 133 are formed in such a manner as to penetrate through the upper holder neck 131 and the lower holder neck 132. Since the damper shaft 133 is elastically supported by the damper spring 136 which is located between the upper holder neck 131 and the compartment 134 and the damper spring 137 which is located between the compartment 134 and the lower holder neck 132, the top and lower of the damper shaft 133 can penetrate through the upper holder neck 131 and the lower holder neck 132.

The upper neck holder 131, the lower neck holder 132 and the compartment 134, which are components directly in contact with the damper springs 136,137, are directly bearing on the weight or external force to be applied to the damper springs 136 137.

The top of the damper shaft 133 passes through the upper holder neck 131 and is connected to the first post 140. The top of damper shaft 133 may directly be connected to the first post 140, or the first post 140 may be connected to the anti-vibration unit 130 or the damper shaft 133 by a base holder 135.

The base holder 135 is a cap-shaped member to be placed at the top of the damper shaft 133 and inserted into the top of the second post 150 in such a manner as to move up and down. The first post 140 may be connected and fixed to the upper portion of the base holder 135.

Meanwhile, the plurality of damper springs 136,137 is provided along the longitudinal direction of the damper shaft 133 on the outer surface thereof. It is preferable to vertically arrange the damper springs in such a manner as to be separated to be each other. To this, the damper shaft 133 may be formed with a compartment 134 at the center to spatially separate the damper spring 136, 137.

In FIGS. 3 to 5, an anti-vibration unit 130 having two damper springs 136,137 is shown. However, the number of the damper springs may be determined according to the size of the vibrations or shocks to be attenuated.

The first damper spring 136 and the second damper spring 137 may be formed to have the same shape and the same elasticity coefficient, but they may also be differently formed from each other in at least one of winding length, cross-sectional shape, size of diameter and elastic modulus. Here, the winding length is a length when the wound damper spring is unfolded to be in a linear type and the cross-sectional shape is a cross-sectional shape of the wire that is unfolded to be in a linear type.

For example, the first damper spring 136 located at the upper portion uses a soft spring having a small elasticity coefficient and the second damper spring 137 located at the lower portion uses a hard spring having a larger elasticity coefficient, thereby attenuating vibrations which occur in a ship due to waves or the like by means of the whole damper springs 136, 137 in a state in which forces caused by the self-weights of the signal transmitting and receiving unit 109 and the driving unit 119 are supported by the first soft damper spring 136 at the upper portion. Further, in consideration of initial compression of the damper springs by the self-weights of the signal transmitting and receiving unit 109 and the driving unit 119, it is preferable that the first damper spring 136 uses a long spring having a smaller elasticity coefficient than the second damper spring 137.

Here, the anti-vibration unit 130 of the antenna for satellite communication 100 according to an embodiment of the present invention may further include an elastic member 138 which is provided between windings of the damper springs 136, 137. As shown in FIGS. 4 and 5, the elastic member 138 has the same winding form as the damper springs 136,137 and may be capable of preventing a contact between the windings of the damper springs 136,137. If no elastic member 138 is present, when an excessive weight is loaded on the damper springs 136 137, the damper springs 136 137 are completely compressed and the weight may continually be applied in a state in which the windings of the damper springs are in contact with each other. As a result, the damper springs may not be able to absorb the vibrations or shocks and may cause a damage of the antenna, etc. In order to prevent this phenomenon, it is preferable to separately insert the elastic member 138 between the windings of the damper springs 136, 137.

The elastic member 138 may be formed using at least one of rubber, silicone and urethane. When the urethane is used, it is preferable to use a low-resistance urethane or low-elasticity urethane.

On the other hand, in FIGS. 6, 7*a* and 7*b*, a mount 180 is shown, the mount 180 may include a cap 181 for supporting the mount 180 under the bottom of the damping base 170, a buffer 183 formed at the lower portion of the cap 181, and a mount plate 185 formed under the bottom of the buffer 183.

The cap 181 may be formed of a metallic material and the buffer 183 may be formed of a rubber or silicone material. The buffer 183 and the cap 181 may be coupled to each other by using a fastening member such as a bolt or an adhesive, and the cap 181 may be formed with a through-hole 187 for coupling them. The mount plate 185 may be formed with a fastening hole 186 for fastening the mount 180 to the mount plate 190. The buffer 183 makes it possible to attenuate the vibrations or shocks in the up and down direction, in the left and right direction, or in the front and rear direction on the cap 181.

A plurality of mounts 180 may be radically provided at a certain distance around the center of the second post 150. For example, the plurality of mounts 180 may be provided at the equal intervals from the center of the second post 150.

The anti-vibration unit 130 mainly attenuates the vibrations or shocks applied to the signal transmitting and receiving unit 109 in the up and down direction, namely the Y-axis, while the mount 180 is capable of attenuating the vibrations or shocks applied to the signal transmitting and receiving unit 109 in the up and down direction, in the left and right direction, or in the front and rear direction. That is, the mount 180 may prevent the vibrations or the shocks caused in the X-axis direction, in the Y-axis direction and in the Z-axis direction from being transmitted to the signal transmitting and receiving unit 109 or the driving unit 119. In addition, the mount 180 may also attenuate a torsion motion or the like generated around the Y-axis or the center of the second post 150.

The vertically arranged anti-vibration unit 130 has a large absorption capacity for the vibrations or shocks in the Y-axis direction, while the mount 180 has a smaller absorption capacity for the vibrations or shocks than the anti-vibration unit 130.

The anti-vibration unit 130 and the mount 180 may attenuate external forces or vibrations having vibration frequencies with different bands, the anti-vibration unit 130 and the mount 180 may complementarily attenuate or absorb the vibrations or shocks. For example, the damper springs 136,137 of the anti-vibration unit 130 are capable of attenuating vibrations with the low frequency band, and the mount 180 is capable of attenuating vibrations with the relatively high frequency band. In addition, the elastic member 138 in the anti-vibration unit 130 may prevent the satellite antenna from being broken and damaged resulting from a high intensity of impact. Thus, the antenna for satellite communication 100 according to an embodiment of the present invention is capable of absorbing or attenuating most of the vibrations, the external forces or the shocks which are applied to the antenna for satellite communication by using the anti-vibration unit 130 having the damper spring 136 137 and the elastic member 138 and the mount 180, thereby increasing the durability, performance or the like of the antenna for satellite communication.

Referring to FIG. 2, the first post 140 may perform a vertical motion relative to the second post 150 by means of the anti-vibration unit 130. However, since the first post 140 is not completely upright like the second post 150 but tilted, a point at which the weights of the reflecting plate 101 and the other components connected to the first post 140 are applied, is surely spaced from the center of the second post 150. Thus, there is a possibility that the base holder 135 does not move along an absolutely perpendicular path because of the loads applied to the top of the first post 140. The antenna for satellite communication 100 according to the present invention may include a lifting guide 120, by the lifting guide, the base holder 135 can move upwardly and downwardly in the absolutely perpendicular direction and the first post 140 can move upwardly and downwardly in the same state with respect to the second post 150.

As shown in FIG. 2, a lifting guide 120 may be formed on the same one side of the first post 140 and the second post 150 to guide the up-down motion of the first post 140 with respect to the second post 150.

The lifting guide 120 may ensure that the first post 140 or the base holder 135 upwardly and downwardly moves or elevates along the vertical path with respect to the second post 150 and prevent the first post 140 from tilting or rotating when it elevates or upwardly and downwardly moves. The lifting guide 120 may include a pair of guide bearings 126 arranged at any one side of the first post 140 and the second post 150; and lifting members 121,122,123 mounted at the side of the other post, located between the pair of guide bearings 126, and being in contact with at least one of the guide bearings 126.

The lifting members 121,122,123 may include a first stopper 121 mounted on any one side of the first post 140 and the second post 150; a guide 123 formed integrally with the first stopper 121 in such a manner as to have a smaller width than the first stopper 121 and located between the pair of guide bearings 126; and a second stopper 122 formed integrally with the guide 123 in such a manner as to have a width greater than the first stopper 121 and opposite to the first stopper 121 with respect to the guide 123.

Referring to FIG. 2, the first stopper 121 of the lifting members is fixed to one side surface of the first post 140 by a fastening member (not shown) such as a bolt, and the pair of guide bearings 126 may be fixedly mounted on the same side surface of the second post 150. The pair of guide bearings 126 has a shape of a wheel bearing, and rotates in contact with the guide 123, which passes there between. The guide bearing 126 is preferably formed of an elastic material for cushioning the shocks when it is in contact with the first stopper 121 or the second stopper 122.

The guide 123 of the lifting members has a small width than the first stopper 121, and may be formed to have substantially the same width as the distance between the guide bearings 126. The guide 123 performs a lift/up-down movement between the guide bearings 126 and comes into contact with at least one of guide bearings 126 at the time of the lift/up-down movement. The up-down movement of the first post 140 may be prevented from getting out of the vertical path because the guide 123 performs the lift/up-down movement in contact with the guide bearings 126.

The second stopper 122 is located at one side of the second post 150 together with guide bearings 126. As such, any one of the first stopper 121 and second stopper 122 may be located at one side of the same post 140, 150 as the pair of guide bearings 126.

The length of the guide 123 may be formed smaller than the maximum relative movement distance of the first post 140 with respect to the second post 150. If the length of the guide 123 is equal to or longer than the maximum relative movement distance of the first post 140 with respect to the second post 150, it is preferable that the length of the guide 123 is formed smaller than the maximum relative movement distance of the first post 140 with respect to the second post 150, because the mutual interference may occur between the first post 140 and the second post 150.

The first post 140 may upwardly and downwardly move or lift up over the length of the guide, namely the shortest distance between the first stopper 121 and the second stopper 122. That is to say, the first post 140 may upwardly and downwardly move or lift up until the end of the first stopper 121 and the end of the second stopper 122 adjacent to the guide bearings 126 are in contact with the guide bearings 126.

A curved surface may be formed a side surface at an area where the first stopper 121 and the second stopper 122 are in contact with the guide 123. That is to say, the corner sides of the end of the first stopper 121 and the end of the second stopper 122 adjacent to the guide bearings 126 are formed to be a curved surface, thereby increasing an area that is in contact with the guide bearings 126 and preventing the guide bearings 126 from being damaged or worn down by the first stopper 121 and the second stopper 122.

As described above, although the present invention is described by specific matters such as concrete components and the like, the accompanying drawings and the foregoing exemplary embodiments, they are provided only for assistance in the entire understanding of the present invention. Therefore, the present invention is not limited to the following exemplary embodiments. Various modifications and changes may be made by those skilled in the art to which the present invention pertains from this description. Therefore, the spirit of the present invention should not be limited to the above-described exemplary embodiments and the following claims as well as all modified equally or equivalently to the claims are intended to fall within the scopes and spirit of the invention.

INDUSTRIAL APPLICABILITY

The invention may be used for an antenna for satellite or the like mounted in a moving object including a vehicle, a ship, etc.

The invention claimed is:
1. An antenna for satellite communication comprises:
   a signal transmitting and receiving unit for receiving or transmitting a signal from/to a satellite;
   a driving unit coupled to the signal transmitting and receiving unit for rotating the signal transmitting and receiving unit so as to enable the signal transmitting and receiving unit to track the satellite;
   a first post on which the signal transmitting and receiving unit is mounted through the driving unit, the first post being formed of a hollow tube;
   a second post coupled to the first post, the second post being formed of a hollow tube, and the first post being inclined with respect to the second post at a predetermined angle; and
   an anti-vibration unit disposed inside the second post for elastically supporting the signal transmitting and receiving unit and the driving unit,
   wherein the anti-vibration unit comprises: a damper shaft provided inside the second post along a longitudinal direction of the second post, a plurality of damper springs wound around an outer surface of the damper shaft along a longitudinal direction of the damper shaft, and an elastic member disposed between two neighboring windings of the damper springs,
   wherein the first post is coupled to an upper portion of the damper shaft of the anti-vibration unit, and
   wherein the elastic member has a same form as that of the damper springs so as to surface-to-surface contact with the two neighboring windings of the damper springs.

2. The antenna for satellite communication of claim 1, wherein the anti-vibration unit comprises: a upper holder neck for supporting the upper portion of the damper shaft and a lower holder neck for supporting a lower portion of the damper shaft, and the damper shaft is configured to penetrate the upper holder neck and the lower holder neck and upwardly and downwardly move through the upper holder neck and the lower holder neck.

3. The antenna for satellite communication of claim 2, wherein the plurality of damper springs includes a first damper spring and a second damper spring, and the damper shaft is formed with a compartment for separating the first damper spring and the damper spring from each other.

4. The antenna for satellite communication of claim 3, wherein the first damper spring has a winding length longer than that of the second damper spring, and an elastic coefficient smaller than that of the second damper spring.

5. The antenna for satellite communication of claim 1, wherein the elastic member is formed using at least one of rubber, silicone and urethane.

6. The antenna for satellite communication of claim 1, further comprising: a lifting guide for vertical movement of the first post with respect to the second post.

7. The antenna for satellite communication of claim 6, wherein the lifting guide comprises: a pair of guide bearings mounted at one of the first post and the second post; and lifting members mounted at the other one of the first post and the second post, the lifting members being located between the pair of guide bearings, and being in contact with at least one of the guide bearings.

8. The antenna for satellite communication of claim 7, wherein the lifting members comprise: a first stopper mounted at one side of either the first post or the second post;
a guide formed integrally with the first stopper in such a manner as to have a smaller width than the first stopper and located between the pair of guide bearings; and
a second stopper formed integrally with the guide in such a manner as to have a greater width than the first stopper and opposite to the first stopper with respect to the guide.

9. The antenna for satellite communication of claim 8, wherein any one of the first stopper and the second stopper is located at a same side of the first post and the second post as the pair of guide bearings.

10. The antenna for satellite communication of claim 8, wherein a length of the guide is formed to be smaller than a maximum relative movement distance of the first post with respect to the second post, and
wherein a curved surface is formed on a side surface where the first stopper and the second stopper are connected with the guide.

11. The antenna for satellite communication of claim 6, wherein a lower end of the second post is supported by a plurality of mounts disposed radially with respect to a center of the second post, and
wherein the anti-vibration unit and the mount are capable of attenuating vibrations or external forces with vibration frequencies of different bands.

* * * * *